(12) United States Patent
Hinchliffe et al.

(10) Patent No.: US 9,003,314 B2
(45) Date of Patent: Apr. 7, 2015

(54) SYSTEM, METHOD, AND COMPUTER PROGRAM PRODUCT FOR DETECTING UNWANTED DATA BASED ON AN ANALYSIS OF AN ICON

(75) Inventors: Alexander James Hinchliffe, Milton Keynes (GB); Oliver Georges Devane, Aylesbury (GB); Lee Codel Lawson Tarbotton, Aylesbury (GB)

(73) Assignee: McAfee, Inc., Santa Clara, CA (US)

( * ) Notice: Subject to any disclaimer, the term of this patent is extended or adjusted under 35 U.S.C. 154(b) by 784 days.

(21) Appl. No.: 12/187,196

(22) Filed: Aug. 6, 2008

(65) Prior Publication Data

US 2013/0276105 A1    Oct. 17, 2013

(51) Int. Cl.
*G06F 3/048* (2013.01)
*G06F 21/50* (2013.01)
*G06F 21/55* (2013.01)

(52) U.S. Cl.
CPC .............. *G06F 21/50* (2013.01); *G06F 21/554* (2013.01)

(58) Field of Classification Search
USPC .................. 715/762, 763, 967; 726/2, 22–25; 382/243
See application file for complete search history.

(56) References Cited

U.S. PATENT DOCUMENTS

| | | | |
|---|---|---|---|
| 8,256,000 B1* | 8/2012 | Krishnappa ..................... | 726/24 |
| 2005/0251758 A1* | 11/2005 | Cummins et al. ............. | 715/838 |
| 2006/0242712 A1* | 10/2006 | Linn et al. ....................... | 726/26 |
| 2007/0056035 A1* | 3/2007 | Copley ............................ | 726/22 |
| 2008/0127340 A1* | 5/2008 | Lee ................................. | 726/22 |
| 2009/0158164 A1* | 6/2009 | Nadeem et al. ................ | 715/741 |
| 2011/0302655 A1* | 12/2011 | Tikkanen et al. ............... | 726/24 |

\* cited by examiner

*Primary Examiner* — Dino Kujundzic
(74) *Attorney, Agent, or Firm* — Wong Cabello Lutsch Rutherford & Brucculeri, LLP.

(57) ABSTRACT

A system, method, and computer program product are provided for detecting unwanted data based on an analysis of an icon. In use, an icon is analyzed. Furthermore, unwanted data is detected based on the analysis.

18 Claims, 4 Drawing Sheets

… (1)

SYSTEM, METHOD, AND COMPUTER PROGRAM PRODUCT FOR DETECTING UNWANTED DATA BASED ON AN ANALYSIS OF AN ICON

FIELD OF THE INVENTION

The present invention relates to detecting unwanted data, and more particularly to systems for detecting unwanted data.

BACKGROUND

Traditionally, systems have been provided for detecting unwanted data, such that devices employing such systems may be secured from the unwanted data. However, techniques utilized by such systems for detecting unwanted data have generally exhibited various limitations. Just by way of example, traditional systems have been incapable of detecting unwanted data based on icons associated with such unwanted data.

There is thus a need for addressing these and/or other issues associated with the prior art.

SUMMARY

A system, method, and computer program product are provided for detecting unwanted data based on an analysis of an icon. In use, an icon is analyzed. Furthermore, unwanted data is detected based on the analysis.

DETAILED DESCRIPTION

Figure 1:
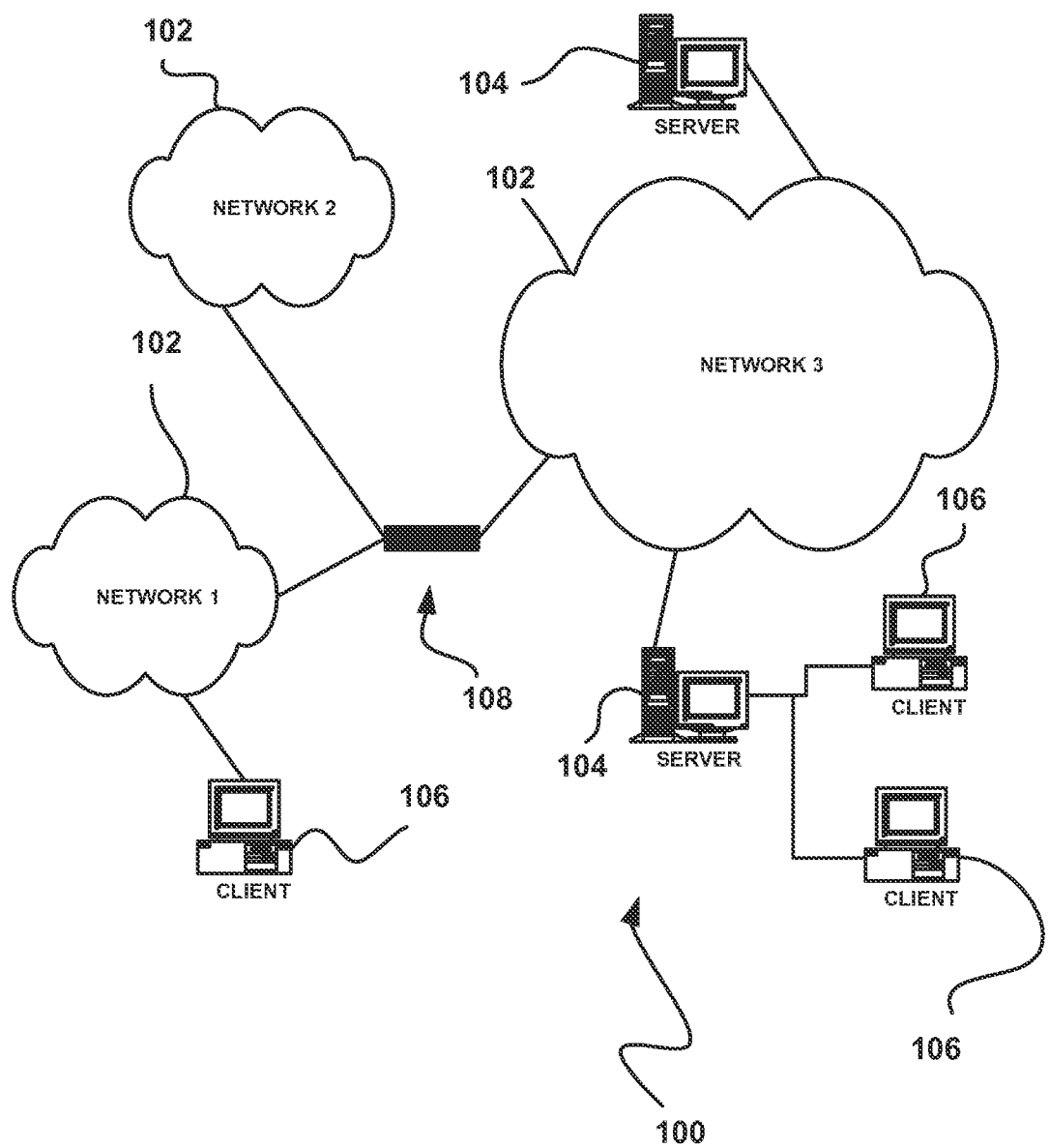
FIG. 1 illustrates a network architecture, in accordance with one embodiment.

FIG. 1 illustrates a network architecture 100, in accordance with one embodiment. As shown, a plurality of networks 102 is provided. In the context of the present network architecture 100, the networks 102 may each take any form including, but not limited to a local area network (LAN), a wireless network, a wide area network (WAN) such as the Internet, peer-to-peer network, etc.

Coupled to the networks 102 are servers 104 which are capable of communicating over the networks 102. Also coupled to the networks 102 and the servers 104 is a plurality of clients 106. Such servers 104 and/or clients 106 may each include a desktop computer, lap-top computer, hand-held computer, mobile phone, personal digital assistant (PDA), peripheral (e.g. printer, etc.), any component of a computer, and/or any other type of logic. In order to facilitate communication among the networks 102, at least one gateway 108 is optionally coupled therebetween.

Figure 2:
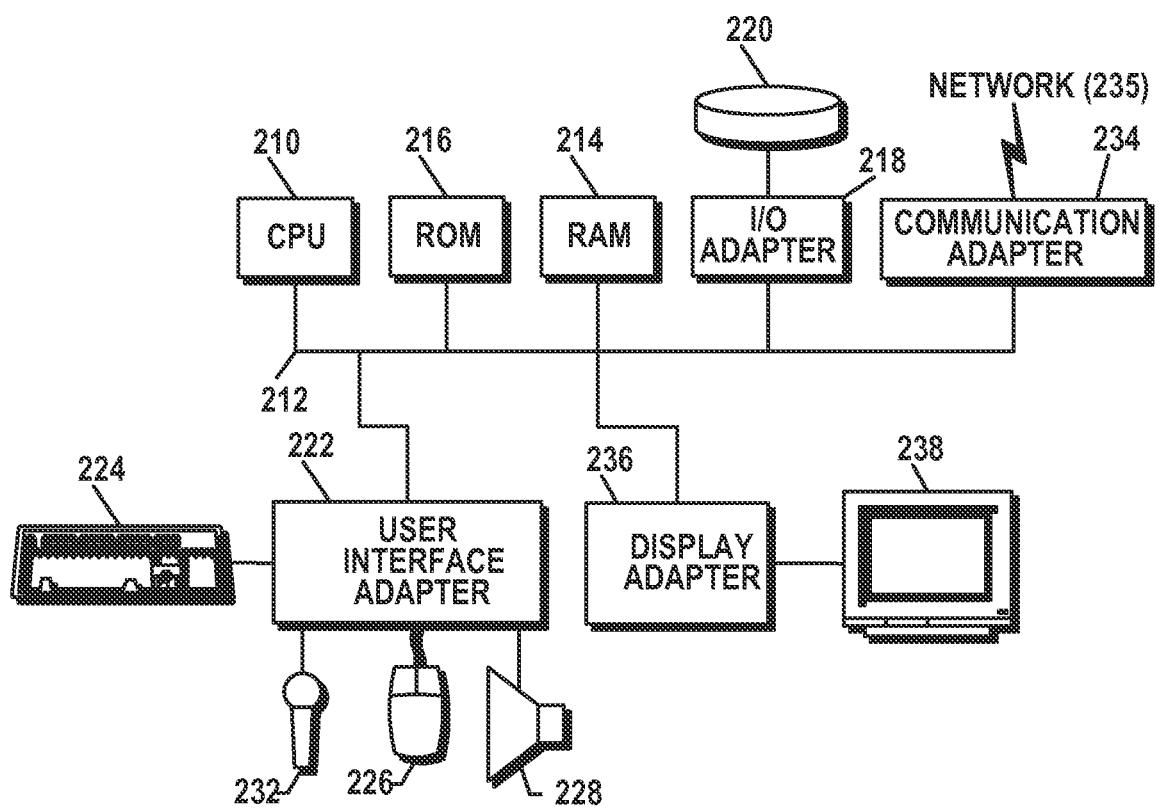
FIG. 2 shows a representative hardware environment that may be associated with the servers and/or clients of FIG. 1, in accordance with one embodiment.

FIG. 2 shows a representative hardware environment that may be associated with the servers 104 and/or clients 106 of FIG. 1, in accordance with one embodiment. Such figure illustrates a typical hardware configuration of a workstation in accordance with one embodiment having a central processing unit 210, such as a microprocessor, and a number of other units interconnected via a system bus 212.

The workstation shown in FIG. 2 includes a Random Access Memory (RAM) 214, Read Only Memory (ROM) 216, an I/O adapter 218 for connecting peripheral devices such as disk storage units 220 to the bus 212, a user interface adapter 222 for connecting a keyboard 224, a mouse 226, a speaker 228, a microphone 232, and/or other user interface devices such as a touch screen (not shown) to the bus 212, communication adapter 234 for connecting the workstation to a communication network 235 (e.g., a data processing network) and a display adapter 236 for connecting the bus 212 to a display device 238.

The workstation may have resident thereon any desired operating system. It will be appreciated that an embodiment may also be implemented on platforms and operating systems other than those mentioned. One embodiment may be written using JAVA, C, and/or C++ language, or other programming languages, along with an object oriented programming methodology. Object oriented programming (OOP) has become increasingly used to develop complex applications.

Of course, the various embodiments set forth herein may be implemented utilizing hardware, software, or any desired combination thereof. For that matter, any type of logic may be utilized which is capable of implementing the various functionality set forth herein.

Figure 3:
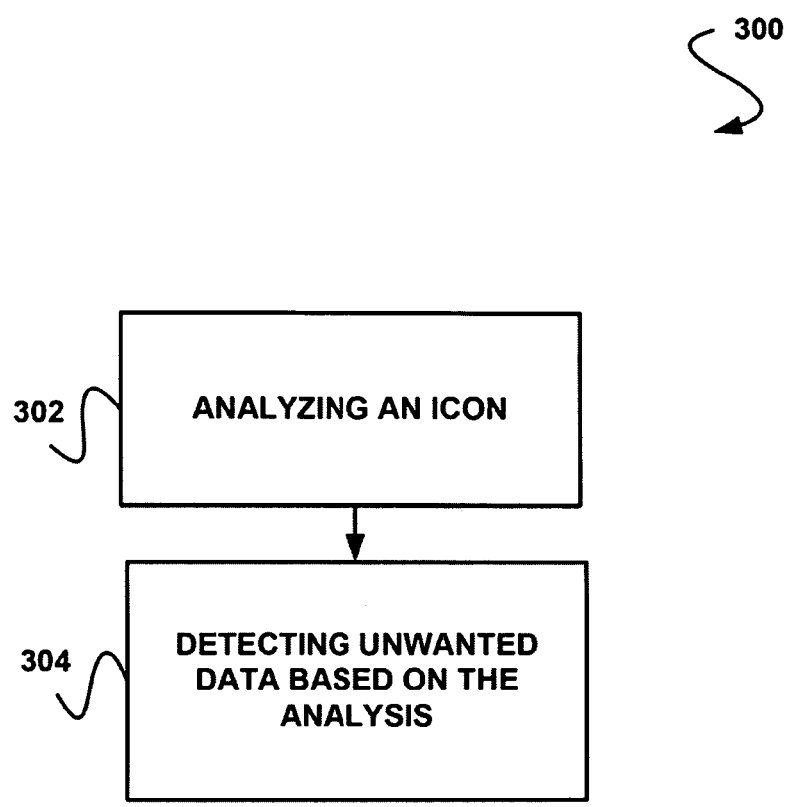
FIG. 3 shows a method for detecting unwanted data based on an analysis of an icon, in accordance with one embodiment.

FIG. 3 shows a method 300 for detecting unwanted data based on an analysis of an icon, in accordance with one embodiment. As an option, the method 300 may be carried out in the context of the architecture and environment of FIGS. 1 and/or 2. Of course, however, the method 300 may be carried out in any desired environment.

As shown in operation 302, an icon is analyzed. With respect to the present description, the icon may include any type of image. For example, the icon may include an image of a file, a folder, etc.

As another example, the icon may be associated with an application. Such application may include an executable application, in one embodiment. To this end, selecting the icon may result in execution of the application. As an option, the icon may be selected by a user clicking on the icon.

In one embodiment, analyzing the icon may include generating a hash of the icon. Of course, however, a checksum, signature, etc. of the icon may be generated in other embodiments. Additionally, the analysis may include comparing the hash to a white list. Such white list may optionally include a list of known wanted icons (e.g. icons predetermined to be associated with wanted, non-malicious, etc. applications).

In another embodiment, if it is determined that the hash is included in the white list, based on the comparison, the analysis of the icon may further include determining whether an application associated with the hash is valid. As an option, the application associated with the hash may be determined to be valid if the application includes one which is predetermined to be valid for the hash. For example, each hash in the white list may be predetermined to be associated with a particular application (e.g. an application determined to be wanted, non-malicious, legitimate, etc.). Thus, the application associated with the hash may be compared to an application predetermined to be valid for such hash.

As another option, the application associated with the hash may be determined to be valid if a characteristic of the application includes one which is predetermined to indicate that the application is valid. Just by way of example, such characteristic may include the application not being packed (e.g. encrypted, compressed, etc.). To this end, if it is determined that the application associated with the hash is packed (or optionally that the icon from which the hash is generated is included in a packed file), it may optionally be determined that the application is not valid. If, however, it is determined that the application associated with the hash is packed, it may optionally, be determined that the application is valid.

As another example, the characteristic may include the application containing multiple different icons. Thus, if it is determined that the application associated with the hash contains multiple different icons, it may optionally be determined that the application is valid. As another option, if it is determined that the application associated with the hash does not contain multiple different icons (e.g. contains only the icon from which the hash is generated), it may be determined that the application is not valid). Of course, it should be noted that the characteristic may include any desired aspect capable of being predetermined to indicate whether the application associated with the hash is valid.

As yet another option, analysis may include comparing the hash to a black list. The black list may include a list of known unwanted icons. Such known unwanted icons may include icons predetermined to be associated with unwanted, malicious, etc. applications, for example.

In another embodiment, the analysis may include a heuristic analysis of at least one aspect associated with the icon. As an option, the heuristic analysis may only be performed if it is determined that the hash of the icon is included in the white list. Moreover, the heuristic analysis may include any analysis of the icon that is based on a context of the aspect associated with the icon.

The aspect associated with the icon may include a file in which the icon resides. For example, the heuristic analysis may include determining whether the file in which the icon resides is valid (e.g. is predetermined to be wanted, non-malicious etc.). As another example, the heuristic analysis may include determining whether a name of the file, an extension of the file, etc. in which the icon resides indicates that the file is valid (e.g. whether the aspect associated with the icon is predetermined to be associated with a valid file, etc.).

As another option, the aspect associated with the icon may include version information corresponding with an application associated with the icon. Thus, the heuristic analysis may optionally include determining whether the application associated with the icon is valid by determining whether the application includes version information for such application. For example, if the application includes version information, it may be determined that such application is valid.

As yet another option, the aspect associated with the icon may include a language in which the application associated with the icon is written. For example, the heuristic analysis may include determining whether the language in which the application associated with the icon is written indicates that the application is valid. In one embodiment, if the language in which the application is written is predetermined to be a language in which known wanted applications are written, it may be determined that the application is valid. In another embodiment, if the language in which the application is written is not predetermined to be a language in which known wanted applications are written (e.g. is predetermined to be a language in which known unwanted applications are written), it may be determined that the application is not valid.

In still yet another embodiment, the analysis of the icon may involve pixels used to render the icon. For example, the pixels may be compared with at least one set of pixels associated with an icon predetermined to be wanted, predetermined to be associated with a wanted application, etc. As another option, the analysis may include an image recognition involving the icon. Such image recognition may compare the icon to at least one predetermined image (e.g. image predetermined to be associated with an icon used by a wanted application, etc.) for determining whether the image includes the predetermined image. As another option, the image recognition may include determining whether (and optionally an extent to which) the pixels used to render the icon vary from the predetermined image, such as a color the pixels, a number of the pixels, etc.

In addition, the analysis of the icon may be performed at any desired time. In one embodiment, the icon may be analyzed on-access. For example, the icon may be selected in response to a detection of a selection of the icon (e.g. by a user, etc.).

In another embodiment, the icon may be analyzed on-demand. Thus the icon may be analyzed independent of a selection of the icon. Just by way of example, the icon may be analyzed based on a scheduled analysis.

Furthermore, as shown in operation 304, unwanted data is detected based on the analysis. In various embodiments, the unwanted data may include malware, spyware, adware, etc. Of course, however, the unwanted data may include any data determined to be unwanted. Also, the unwanted data may include the application associated with the icon, the icon itself, and/or any other data associated with the icon.

In one embodiment, the unwanted data may be detected if it is determined that the icon is included in the white list but is associated with an invalid application. Just by way of example, it may be determined that the icon corresponds unwanted data if the application associated with the icon does not include one which is predetermined to be valid for the hash of the icon. In another embodiment, the unwanted data may be detected if it is determined that the icon is included in the black list.

In yet another embodiment, the unwanted data may be detected if the heuristic analysis indicates that the aspect associated with the icon indicates that the icon is associated with unwanted data. For example, if it is determined that the file in which the icon resides is not valid, based on the heuristic analysis, the unwanted data may be detected. As another example, if it is determined that the language in which the application associated with the icon is written indicates that the application is not valid, based on the heuristic analysis, the unwanted data may be detected.

In still yet another embodiment, if it is determined that pixels, used to render the icon do not include pixels associated with an icon predetermined to be wanted, predetermined to be associated with a wanted application, etc., the unwanted data may be detected. In another embodiment, if the image recognition involving the icon results in a determination that the icon does not include a predetermined image, that the pixels used to render the icon vary from a predetermined image, etc., the unwanted data may be detected.

In this way, unwanted data may be detected based on an analysis of an icon. For example, use of the icon by unwanted data for executing such unwanted data may be detected. Such use of the icon may be detected if the icon is also associated with a valid application (e.g. wanted data), and also if the icon is unique to (e.g. only associated with) the unwanted data, such as if the icon is created specifically for the unwanted data.

More illustrative information will now be set forth regarding various optional architectures and features with which the foregoing technique may or may not be implemented, per the desires of the user. It should be strongly noted that the following information is set forth for illustrative purposes and should not be construed as limiting in any manner. Any of the following features may be optionally incorporated with or without the exclusion of other features described.

Figure 4:
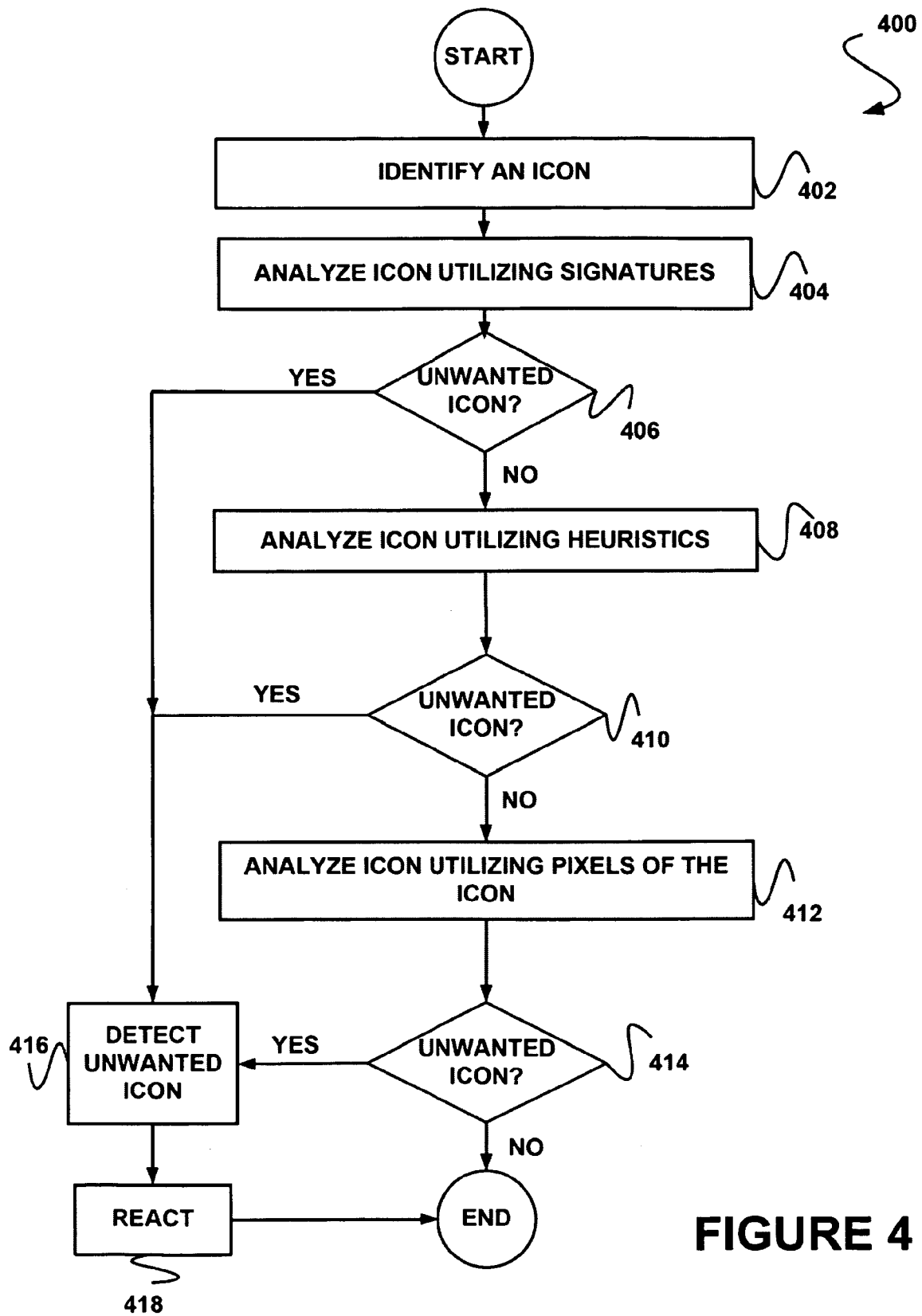
FIG. 4 shows a method for detecting unwanted icons, in accordance with another embodiment.

FIG. 4 shows a method 400 for detecting unwanted icons, in accordance with another embodiment. As an option, the method 400 may be carried out in the context of the architecture and environment of FIGS. 1-3. Of course, however, the method 400 may be carried out in any desired environment. It should also be noted that the aforementioned definitions may apply during the present description.

As shown in operation 402, an icon is identified. In one embodiment, the icon may be identified based on a scan for icons. For example, a device storing the icon, a system (e.g. operating system) employing the icon, etc. may be scanned for identifying the icon.

In one embodiment, the icon may be identified based on an on-access scan. For example, the icon may be identified in response to a selection of the icon. In another embodiment, the icon may be identified based on an on-demand scan, such that the icon may be identified independent of a selection thereof.

Additionally, as shown in operation 404, the icon is analyzed utilizing signatures. For example, a hash of the icon may be generated. In one embodiment, the hash may be compared to a black list of hashes associated with known unwanted icons (e.g. icons predetermined to be associated with unwanted applications). Thus, if the hash is included in the black list, it may optionally be determined that the icon is unwanted.

In another embodiment, the hash may be compared to a white list of hashes associated with known wanted icons (e.g. icons predetermined to be associated with wanted applications). If the hash is determined to be included in the white list, the icon may be identified as a type of icon which is associated with a wanted application. However, it may be further be determined whether the particular application associated with the icon (e.g. the application executed via the icon, etc.) is a wanted application.

As an option, at least one characteristic of the application associated with the icon may be identified for determining whether such characteristic is indicative of the application being a wanted application. Just by way of example, if the application is packed, it may be determined that the application is unwanted. If the application is not packed, it may be determined that the application is wanted.

As another example, if the application includes multiple different icons, it may be determined that the application is wanted (e.g. as multiple icons may indicate that the application is a legitimate, non-malicious application and a single icon included in the application may indicate that the icon is utilized for deceptive purposes, such as for mischaracterizing an unwanted application as a wanted application). If the application does not include multiple different icons, it may be determined that the application is unwanted. In this way, if the icon is associated with multiple different applications, it may be determined whether any of such applications are unwanted.

Further, it is determined whether the icon is unwanted, as shown in decision 406. In one embodiment, the icon may be determined to be unwanted if the hash of the icon is included in the black list. In another embodiment, it may be determined that the icon is unwanted if the hash of the icon is included in the white list and if it is determined that the particular application associated with the icon is not a wanted application.

If it is not determined that the icon is unwanted, the icon is analyzed utilizing heuristics. Note operation 408. Thus, as an option, the heuristics may be utilized for identifying whether the icon is unwanted when the icon cannot be determined to be predetermined to be unwanted (e.g. based on the black list). For example, the heuristics may be utilized for identifying whether the icon is unwanted when the hash of the icon is included in the white list, but it is unknown whether the application associated with icon is unwanted.

In one embodiment, a file containing the icon may be analyzed for determining whether such file is predetermined to be wanted. Such analysis may include determining whether a name of the file is indicative of a file predetermined to be wanted. For example, if the file is not predetermined to be wanted, it may be determined that the icon is unwanted.

As another option, the analysis of the file may include determining whether a file extension of the file is indicative of a file predetermined to be wanted. For example, the icon may be predetermined to be of a type that is associated with a file of a particular type (e.g. as identified by the file extension). To this end, if the file is not predetermined to be wanted, it may be determined that the icon is unwanted.

As yet another option, the analysis of the file may include determining whether the file is stored in a predetermined location. (e.g. a predetermined folder). Just by way of example, it may be determined whether the file is stored in a predetermined folder that is indicative of the file being wanted. If the file is not stored in the predetermined location, it may be determined that the icon is unwanted.

As yet another option, the analysis of the file may include determining whether the file is written in a predetermined language (e.g. high-level language). Such predetermined language may include a language in which wanted files are predetermined to be written. If the file is not written in the predetermined language, it may be determined that the icon is unwanted.

As still yet another option, the analysis of the file may include determining whether the file includes version information (e.g. information indicating a version of the data stored in the file, etc.). For example, it may be determined whether the file includes version information for the file in resources of the file. If it is determined that the file does not include version information, it may be determined that the icon is unwanted.

Accordingly, it may be determined whether the icon is unwanted, as shown in decision 410. If it is not determined that the icon is unwanted, the icon is analyzed utilizing pixels of the icon. Note operation 412. The pixels of the icon may be analyzed in any manner capable of being utilized to determine whether the icon is unwanted.

In one embodiment, the pixels of the icon may be analyzed via pixel identification. As an option, a pattern of pixels of the icon may be identified and compared to sets of pixels of icons predetermined to be wanted. Thus, if the pattern of pixels of the icon matches one of such sets of pixels, it may be determined that the icon is wanted. Of course, as another option, if the pattern of pixels of the icon matches one of such sets of pixels, it may be further be determined whether the particular application associated with the icon is a wanted application, as described above with respect to operation 404. If, however, the pattern of pixels of the icon does not match one of such sets of pixels, it may be determined that the icon is unwanted.

In another embodiment, the pixels of the icon may be analyzed via image recognition. The image recognition may utilize the pixels of the icon to identify image characteristics of the icon. Just by way example, the characteristics may include a number of pixels of a particular color that exist in the icon (e.g. for determining whether the icon is of a folder). Thus, a characteristic of an icon may be identified even when pixels of the icon vary (e.g. up to a threshold amount).

Such characteristics may further be compared to characteristics predetermined to be associated with wanted icons. If the characteristics of the icon matches the characteristics predetermined to be associated with wanted icons, it may be determined that the icon is wanted. Optionally, if the characteristics of the icon matches the characteristics predetermined to be associated with wanted icons, it may be further be determined whether the particular application associated with the icon is a wanted application, as described above with respect to operation 404. If, however, the characteristics of the icon does not match the characteristics predetermined to be associated with wanted icons, it may be determined that the icon is unwanted.

Moreover, as shown in decision 414, it is determined whether the icon is unwanted. If it is not determined that the icon is unwanted, the method 400. In this way, icons not determined to be unwanted based on an analysis thereof may be allowed to exist, be utilized, etc.

If, however, it is determined that the icon is unwanted (in decision 406, 410 or 412, the unwanted icon is detected. Note operation 416. Accordingly, a detection of an unwanted icon may be made.

Furthermore, a reaction to the detection of the unwanted icon is performed, as shown in operation 418. In one embodiment, the reaction may include blocking access to the unwanted icon. Such access may include selection of the icon, for example.

In another embodiment, the reaction may include deleting the icon. In yet another embodiment, the reaction may include removing any data associated with the icon, such as an application associated with the icon. In yet another embodiment, the icon and/or data associated therewith may be quarantined. In still yet other embodiments, detection of the unwanted icon may be logged, a user may be notified, etc.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A non-transitory computer program storage device, with instructions stored thereon, comprising instructions that when executed cause one or more processors to:
   detect selection of an icon, the selection utilized to initiate execution of an application associated with the icon;
   analyze properties of the icon in response to the detection;
   compare the properties of the icon with a list of properties of known icons to identify a matching icon;
   determine that the application is malware, responsive to a determination that the application does not contain multiple icons;
   determine that the icon represents malware responsive to a determination that the icon matches an icon known not to represent malware and the determination that the application is malware.

2. The computer program storage device of claim 1, wherein the instructions that when executed cause the one or more processors to analyze properties of the icon comprise instructions that when executed cause the one or more processors to generate a hash of the icon.

3. The computer program storage device of claim 2, wherein the list of properties of known icons comprises a white list, and
   wherein the instructions that when executed cause the one or more processors to compare the properties of the icon with the list of properties of known icons comprise instructions that when executed cause the one or more processors to compare the hash with the white list.

4. The computer program storage device of claim 2, wherein the list of properties of known icons comprises a black list, and
   wherein the instructions that when executed cause the one or more processors to compare the properties of the icon with the list of properties of known icons comprise instructions that when executed cause the one or more processors to compare the hash with the black list.

5. The computer program storage device of claim 1, wherein the instructions that when executed cause the one or more processors to analyze properties of the icon comprise instructions that when executed cause the one or more processors to determine whether the icon is included in a packed file.

6. The computer program storage device of claim 1, wherein the instructions that when executed cause the one or more processors to analyze properties of the icon comprise instructions that when executed cause the one or more processors to use a heuristic analysis of at least one aspect associated with the icon.

7. The computer program storage device of claim 6, wherein the at least one aspect includes a file in which the icon resides.

8. The computer program storage device of claim 6, wherein the at least one aspect includes version information corresponding with the application.

9. The computer program storage device of claim 6, wherein the at least one aspect includes a programming language in which the application is written.

10. The computer program storage device of claim 1, wherein the instructions that when executed cause the one or more processors to analyze properties of the icon comprise instructions that when executed cause the one or more processors to analyze pixels used to render the icon.

11. The computer program storage device of claim 1, wherein the instructions that when executed cause the one or more processors to analyze properties of the icon comprise instructions that when executed cause the one or more processors to use image recognition involving the icon.

12. The computer program storage device of claim 1, wherein the instructions further comprise instructions that when executed cause the one or more processors to react in response to the detection of the malware.

13. The computer program storage device of claim 12, wherein the instructions that when executed cause the one or more processors to react in response to the detection of the malware comprise instructions that when executed cause the one or more processors to remove the application from a system on which the application is stored.

14. A method, comprising:
   detecting, with a processor, selection of an icon, the selection utilized to initiate execution of an application associated with the icon;
   analyzing properties of the icon with the processor in response to the act of detecting;
   comparing, with the processor, the properties of the icon with a list of properties of known icons to identify a matching icon;
   determining that the application is malware, comprising:
      determining that the application does not contain multiple icons; and
   determining that the icon represents malware, comprising:

determining that the icon matches an icon known not to represent malware and the determination that the application is malware.

15. The method of claim 14, wherein analyzing properties of the icon comprises generating a hash of the icon.

16. The method of claim 15,
wherein the list of properties of known icons comprises a white list, and
wherein comparing the properties of the icon with the list of properties of known icons comprises comparing the hash with the white list.

17. The method of claim 14, wherein analyzing properties of the icon comprises performing a heuristic analysis of at least one aspect associated with the icon.

18. A system comprising:
a memory; and
a hardware processor operatively coupled to the memory, the processor adapted to execute program code stored in the memory, comprising instructions that when executed cause the processor to:
detect a selection of an icon, the selection utilized to initiate execution of an application associated with the icon,
analyze properties of the icon in response to the detection,
compare the properties of the icon with a list of properties of known icons to identify a matching icon,
determine that the application is malware, responsive to a determination that the application does not contain multiple icons; and
determine that the icon represents malware responsive to a determination that the icon matches an icon known not to represent malware and the determination that the application is malware.

* * * * *